(12) United States Patent
Gurovich et al.

(10) Patent No.: US 6,565,929 B2
(45) Date of Patent: May 20, 2003

(54) METHOD FOR PRODUCING MAGNETIC INFORMATION CARRIER

(75) Inventors: Boris Aronovich Gurovich, Moscow (RU); Dmitry Losifovich Dolgy, Moscow (RU); Evgeny Zalmanovich Meylikhov, Moscow (RU); Evgeny Pavlovich Velikhov, Moscow (RU); Vladimir Borisovich Betelin, Moscow (RU); Evgenia Anatolievna Kuleshova, Moscow (RU); Evgeny Dmitrievich Olshansky, Moscow (RU); Boris Aronovich Aronzon, Moscow (RU); Alexandr Viktorovich Kalinin, Moscow (RU)

(73) Assignee: Obschestvo s organichennoi otvetstvennostju "Laboratoria Ionnykh Nanotekhnology" (OOO "Labintech"), Moscow (RU)

( * ) Notice: Subject to any disclaimer, the term of this patent is extended or adjusted under 35 U.S.C. 154(b) by 0 days.

(21) Appl. No.: 09/958,522

(22) PCT Filed: Feb. 9, 2001

(86) PCT No.: PCT/RU01/00056

§ 371 (c)(1),
(2), (4) Date: Oct. 10, 2001

(87) PCT Pub. No.: WO01/59771

PCT Pub. Date: Aug. 16, 2001

(65) Prior Publication Data

US 2002/0182312 A1 Dec. 5, 2002

(30) Foreign Application Priority Data

Feb. 11, 2000 (RU) ........................... 2000103193

(51) Int. Cl.[7] ................................................ C23C 14/00
(52) U.S. Cl. ................. 427/523; 427/128; 427/130; 427/131; 427/249.7; 427/258; 427/259; 427/282; 427/331; 427/399; 427/419.2; 427/533; 427/552; 427/555
(58) Field of Search ................................. 427/128, 130, 427/131, 533, 552, 555, 249.7, 258, 259, 282, 331, 399, 419.2, 523

(56) References Cited

FOREIGN PATENT DOCUMENTS

| EP | 0402065 | 12/1990 |
|----|---------|---------|
| EP | 0287280 | 10/1998 |
| SU | 675446  | 7/1979  |

*Primary Examiner*—Bernard Pianalto
(74) *Attorney, Agent, or Firm*—Collard & Roe, P.C.

(57) ABSTRACT

The method of manufacturing the magnetic medium for data storage comprising magnetic segments (5) for data storage which alternate regularly with nonmagnetic segments, which method comprises deposition on a substrate (1) from a nonmagnetic material a material having low or zero initial magnetization and capable of varying its magnetic characteristics under the effect of irradiation. The mentioned material is laid on the substrate (1) as a layer (2) in a thickness corresponding to one of the overall size values of any one of the magnetic segment (5) being formed. Then the applied layer (2) is selectively irradiated so as to vary the magnetic characteristics of the material of the layer (2) on the irradiated segments before forming the magnetic segments (5) each having a maximum overall size the ratio between which and any other overall size of this magnetic segment is from 3.5:1 to 15:1.

7 Claims, 3 Drawing Sheets

METHOD FOR PRODUCING MAGNETIC INFORMATION CARRIER

CROSS REFERENCE TO RELATED APPLICATIONS

Applicants claim priority under 35 U.S.C. §119 of RUSSIAN Application No. 2 000 1 03193 filed on Feb. 11, 2000. Applicants also claim priority under 35 U.S.C. §120 of PCT/RU01/00056 filed on Feb. 9, 2001. The international application under PCT article 21(2) was not published in English.

TECHNICAL FIELD

The present invention relates, in general, to electronic engineering and, more specifically, concerns the method of manufacturing the magnetic medium for data storage.

BACKGROUND ART

Known in the present state of art is the method of magnetic medium for data storage, said medium appearing as a nonmagnetic matrix incorporating particles of a magnetic material distributed thereover and kept out of contact with each other (cf. U.S. Pat. No. 5,652,054, NPC 428–328, 1997). According to said patent, a desired magnetic medium for data storage is prepared by simultaneous magnetron sputtering of the material of said nonmagnetic matrix and said magnetic material and their vacuum co-deposition on a substrate made of glass, ceramics or metal. Sputtering the material of the nonmagnetic matrix and of the magnetic material in an inert gas, or their chemical deposition from gaseous phase can be used as well. However, the method in question fails to provide a clear-cut regular distribution of magnetic particles in the matrix and prevents attaining identical geometric dimensions and shapes of the magnetic particles and their equal spacing from one another.

Known in the present state of the art is a method of manufacturing magnetic medium for data storage which appears as a matrix made from a nonmagnetic material and having equally sized and shaped magnetic segments spaced equally apart from one another on said matrix and featuring shape anisotropy ensuring two stable magnetized states (cf. U.S. Pat. No. 5,820,769, NPC 216–22, 1998). The production process techniques protected by said patent makes use of an electron-beam lithography procedure comprising the steps of: establishing, on a nonmagnetic substrate, a protective mask made of a resist, i.e., polymethylmethacrylate (PMMA); focusing an electron beam on said resist until a dia. 4 nm spot is obtained; etching said nonmagnetic substrate to form holes therein unprotected by said resist; applying, either by spray-deposition or photo-deposition, a magnetic material to said nonmagnetic substrate; removing said resist from said nonmagnetic substrate; and filling the space confined between the thus-formed segments of the magnetic material, with a nonmagnetic material, e.g., an insulator.

The aforementioned method allows of obtaining relatively large-sized magnetic segments being 120 nm long and 35–40 nm in diameter, that is, shape anisotropy is characterized by a length-to-diameter ratio ranging between 3–3.4 with the spacing between the magnetic segments being from 50 to 1000 nm. However, the density of data recorded on such a medium is rather low, while a relatively weak shape anisotropy affects adversely reliability of storage of recorded data due to spontaneous reversal of magnetization of the magnetic segments caused by nonobservance of some conditions for the magnetic medium exploitation (e.g., absence of magnetic and electromagnetic fields, effect of heat, etc.).

Selected as the prototype of the present invention is a method of manufacturing the magnetic medium for data storage known from the specification of Japanese Application #3-254,421, IPC G 11 B 5/84, 1991. According to said method, a 1 $\mu$m thick layer of a soft magnetic material having high magnetic permeability is either electroplated or spray-deposited on a nonmagnetic substrate. Then a mask is formed on the thus-prepared layer using photolithography technique, whereupon said layer of soft magnetic material is exposed to the effect of a flux of hydrogen or helium ions. Thus, hydrogen or helium ions are free to implant into those portions of said layer which are not protected by the mask during the exposing process so as to transform magnetic properties of said layer at the place of their implantation, i.e., nonmagnetic segments in the layer are generated as a result.

Once the photolithographic mask has been removed, the layer deposited on the substrate comprises both magnetic segments adapted for data storage, and nonmagnetic segments resulting from carrying out the present method and alternating with said magnetic segments in accordance with the pattern of the photolithographic mask.

However, the method under discussion fails to be capable of manufacturing the magnetic medium for data storage that ensures high-density data recording nor does it provide for a very pronounced shape anisotropy of the magnetic segments of the data carrier which may lead to a spontaneous externally induced change in the magnetization vector and, hence, to loss of recorded data.

SUMMARY OF THE INVENTION

The present invention has for its primary and essential object to provide a method of manufacturing the magnetic medium for data storage that makes it possible to attain higher density of recorded data and add to reliability of its storage due to a change in the composition and structure of a material capable of varying its magnetic characteristics under the effect of irradiation. Said object is accomplished due to the provision of a method of manufacturing the magnetic medium for data storage, said method comprising the following steps: laying on a nonmagnetic substrate a layer of a material capable of varying its magnetic characteristics under the effect of irradiation; selectively irradiating said layer with a flux of charged particles so as to vary magnetic characteristics of the material of said layer on the irradiated segments thereof; forming in said layer regularly alternating nonmagnetic and magnetic segments, wherein, according to the present invention, used as the material capable of varying its magnetic characteristics, is a material having a low or zero initial magnetization; irradiating said layer until magnetic segments are formed therein, each of the thus-formed magnetic segments having a maximum overall size the ratio between which and any other overall size of said magnetic segment being from 3.5:1 to 15.0:1, the thickness of said layer being equal to one of the overall size values of any one of the magnetic segments being formed.

It is due to the present invention that it becomes possible to make the magnetic medium for data storage capable of high density and reliable storage of recorded data.

In accordance with the present invention, it is expedient that said selective irradiation of said layer be effected using a mask applied to the layer of the material capable of varying its magnetic characteristics under the effect of irradiation.

According to the invention, it is expedient that said selective irradiation of said layer be effected using a stencil placed in front of the layer being irradiated.

According to the invention, it is expedient that used as the material capable of varying its magnetic characteristics are nonmagnetic compounds of ferromagnetics.

According to the invention, it is expedient that when manufacturing the magnetic medium for data storage adapted for perpendicular data recording, a layer of the material capable of varying its magnetic characteristics has a thickness selected to be from about 10 nm to about 500 nm.

According to the invention, it is expedient that when manufacturing the magnetic medium for data storage adapted for longitudinal data recording, a layer of the material capable of varying its magnetic characteristics has a thickness selected to be from about 2 nm to about 50 nm.

According to the invention, it is expedient that a protective layer be applied to the layer having regularly alternating magnetic and nonmagnetic segments.

Further objects and advantages of the present invention will become apparent from a detailed description of a method of manufacturing the magnetic medium for data storage, of some exemplary embodiments of said method, and of the accompanying drawings, wherein:

Figure 1:
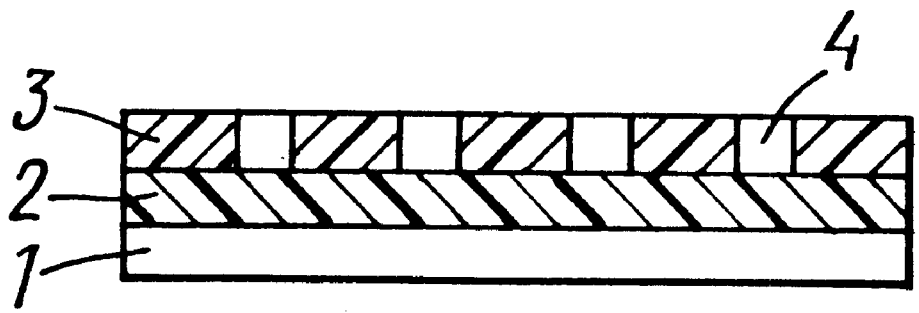
FIGS. 1, 2, and 3 present a sequence, in which the proposed method is carried into effect using lithography.
Figure 2:
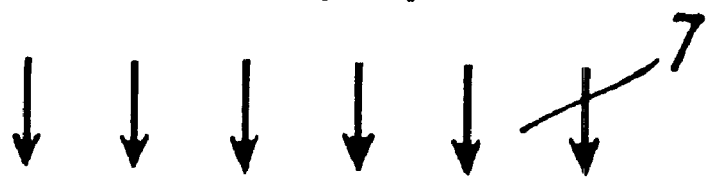
Figure 2:
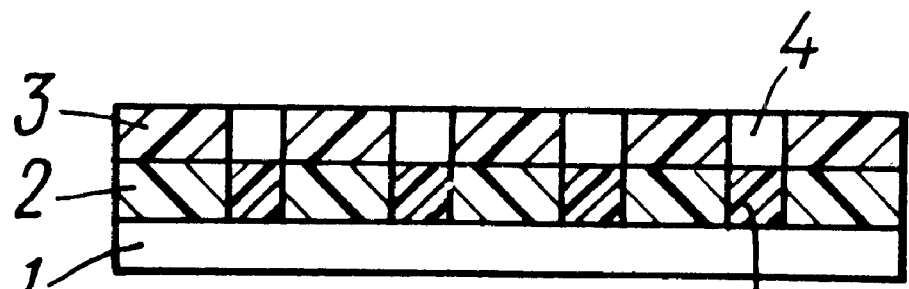
Figure 3:
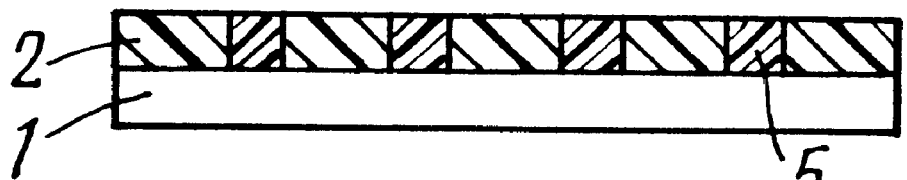
Figure 4:
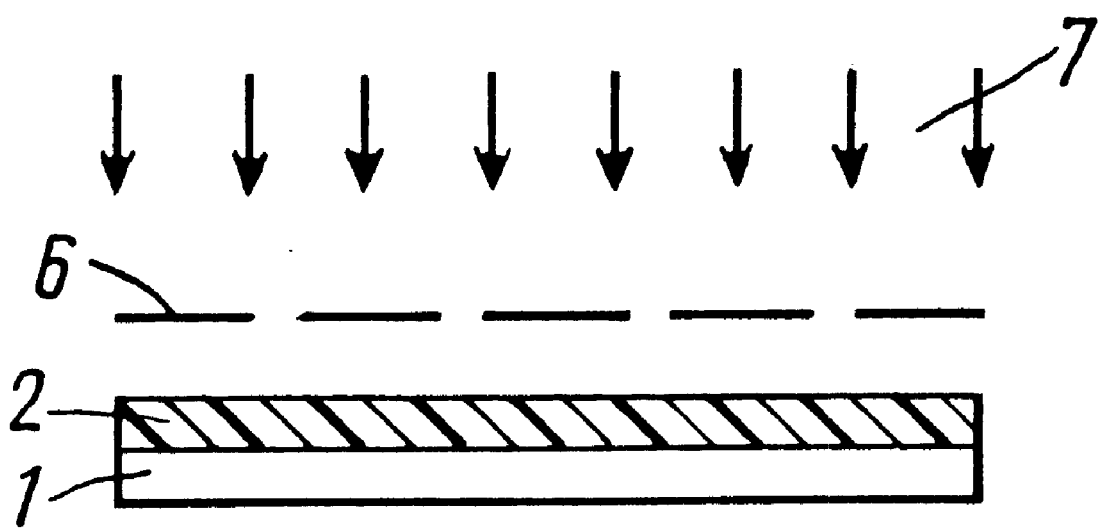
FIGS. 4 and 5 present a sequence, in which the proposed method is carried into effect using a stencil.
Figure 5:
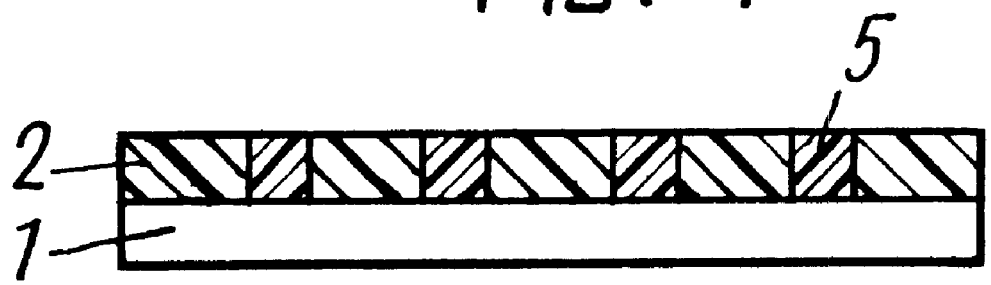

The method proposed herein is adapted for manufacturing the magnetic medium for data storage a data carrying medium appearing as a layer applied to a substrate and consisting of segments from a magnetic material separated from one another with segments from a nonmagnetic material. According to the present invention, said magnetic segments differ in their cross-sectional shape, e.g., round or rectangular, while an overall size of the magnetic segments are to comply with the following condition: a maximum overall size of a magnetic segment correlates with any other overall size of said magnetic segment with a ratio of from 3.5:1 to 15.0:1.

The herein-proposed method of manufacturing the magnetic medium for data storage comprises applying to a nonmagnetic substrate 1 made of, e.g., aluminium, silicon, ceramics or glass, a material capable of varying its magnetic characteristics when exposed to the effect of radiation and having, according to the invention, low or zero initial magnetization. In accordance with the present invention, used as such a material may be a variety of nonmagnetic compounds of ferromagnetic metals, such as $Fe_2O_3$, or $CoO$, or oxides of Permendure or Permalloy; use may be made, apart from the compounds mentioned above, also of any other compounds and materials having the aforesaid characteristics. Said material is laid on the substrate 1 to form a layer 2 having a thickness equal to one of the overall size values of any one of the magnetic segments being formed. For instance, when manufacturing the magnetic medium for data storage adapted for perpendicular data recording, the thickness of a layer of said material may be within 10 to 500 nm which corresponds to a maximum overall size of the magnetic segment, and when manufacturing the magnetic medium for data storage adapted for longitudinal data recording, said material may be applied in a layer 2 to 50 nm thick which corresponds to any one of the smaller overall size values of the magnetic segment.

Then a mask 3 is established on the applied layer 2, using commonly known techniques, e.g., a standard lithography procedure, such as the electron-beam lithography technique, said mask having holes 4, the shape and size of which corresponds to those of magnetic segments 5 required. Use can also be made of a stencil 6 positioned in front of the applied layer 2 and having holes of the aforesaid shape and size, said stencil being position in front of the applied layer 2.

Next, said deposited layer is subjected to selective irradiation, in accordance with the pattern of the mask 3 or the stencil 6, with a flux 7 of charged particles, e.g., electrons, ions, atoms, or others selected from the heretofore-known ones.

The aforesaid irradiation may be effected according to a procedure described in RF U.S. Pat. No. 2,129,320. Said procedure consists in that the flux 7 of charged particles is established, said particles having definite energy and definite particle energy dispersion falling within 0.1 to 5.0 eV. Then the thus-formed flux 7 of charged particles is focused through a system of lenses and directed onto the mask 3 or the stencil 6. Such a system of lenses (electromagnetic or electrostatic ones) provides for primary focusing of the thus-formed flux of charged particles in such a manner that flux divergence is as low as 5.10–2 to 10–4 rad. The thus-established flux of charged particles passes through the mask 3 or the stencil 6, becomes spatially modulated in intensity, and translates information about the pattern of the mask 3 or the stencil 6 to the layer of a material capable of varying its magnetic characteristics under the effect of irradiation. Type of charged particles, their dose and energy are either selected by estimation on the basis of commonly known rules, or experimentally depending on the material of the layer being irradiated capable of varying its magnetic properties under the effect of irradiation and having low or zero initial magnetization.

It is due to complying with the aforesaid conditions that magnetic characteristics of the material of the layer 2 are transformed, i.e., under the effect of charged particles the nonmagnetic material of the layer segments unprotected by the mask 3 or the stencil 6 transforms into the magnetic one, or the material having a low initial magnetization increases its magnetization many times.

As it has been stated hereinbefore, according to the present invention, a layer of the aforesaid material is expedient to be laid on the substrate in a thickness corresponding to one of the overall size values of any one of the segments thereof adapted for data storage. As experimental studies have demonstrated, when the thickness of such a layer exceeding the specified value, as the irradiation process proceeds and charged particles penetrate into the bulk of said layer, said particles are liable to scatter, whereby the region of transformation of the material from one state to the other is extended, and may ultimately cause the magnetic segments being formed to join together, with the resultant adversely affecting or completely destroying shape anisotropy. According to the invention, it has been found that the layer segments from a magnetic material adapted for data storage, in addition, should correspond to a quite definite relationship of their overall size values. It has been revealed experimentally that when forming magnetic segments adapted for data storage, wherein the ratio between their maximum overall size and any other overall size thereof is below 3.5:1, the required reliability of storage of the recorded data is unattainable, whereas the ratio between said parameters in excess of 15:1, on the one hand, is technologically impracticable when producing the magnetic medium for data storage with perpendicular recording due to scattering of the charged particles in the layer of a material having variable magnetic characteristics, and on the other hand, an increase in said ratio fails to perceptibly higher reliability of data storage. Numerous experimental studies have revealed that a maximum overall size of any one of the magnetic segments adapted for data storage should have the ratio of from 3.5:1 to 15:1 with any other overall size values of said magnetic segment. Meeting said condition enables one to attain higher reliability of storage of the recorded data, since the specified ratio between the overall size values provides for so high shape anisotropy that rules out any reversal of the magnetization vector of any magnetic segment adapted for data storage, whereas such a reversal the magnetization vector has previously been possible on account of the effect of temperature and of the magnetic fields of adjacent magnetic segments. In particular, fluctuations of the magnetization vector do not increase the noise level at temperatures below 300–400° C., whereas the signal-to-noise ratio is increased materially, thus adding to the quality of data storage.

Hence as a result of carrying the proposed method into effect a structure is formed on the substrate comprising single-domain magnetic segments for data storage which alternate regularly with the segments from a nonmagnetic material or from a material having low initial magnetization. In this case it is solely meeting the conditions of the proposed method that enables one to obtain a structure wherein the segments from a magnetic material are separated from one another by the segments from a nonmagnetic material, whereby any interference of the magnetic segments with one another is ruled out and high density data recording and reliable recorded data storage are provided.

According to the invention, it is expedient that the layer having regularly alternating magnetic and nonmagnetic segments be coated with a protective layer of, e.g., a diamond-like film, or a previously used mask be used as said protective layer.

BEST METHOD OF CARRYING OUT THE INVENTION

According to the method proposed herein, a layer of a material capable of varying its magnetic characteristics under the effect of charged particles is deposited as a film on a nonmagnetic substrate made from, e.g., aluminium, silicon, ceramics or glass, using a known technique, e.g., sputtering or chemical deposition. Such a material may be, e.g., nonmagnetic compounds of ferromagnetic metals, such as $Fe_2O_3$ or $CoO$ or $SmCoO_5$, as well oxides of Permendure or Permalloy, or else other materials which have been absolutely nonmagnetic until being exposed to irradiation, i.e., said materials have zero saturation magnetization and become magnetic after having been treated with charged particles, or such materials that display weak magnetic properties, that is, low initial magnetization but said properties thereof increase many times after treating said materials with charged particles.

The thickness of said material is selected depending on the type of the magnetic medium being made. For a medium with perpendicular data recording (FIG. 6) the thickness of the layer 2 may be from 10 to 500 nm (i.e., a maximum size of an individual magnetic segment 5), and for a medium with perpendicular data recording (FIG. 7), the thickness of the layer 2 ranges from 2 to 50 nm (any one of the smaller size values of the individual magnetic segment 5).

Then either the mask 3 having a number of holes of the required size and shape is prepared on said layer using a known technique or the stencil 6 having a number of holes 4 of the required size and shape is positioned in front of said layer.

When making a magnetic medium with longitudinal data recording, like in the case of a magnetic medium with perpendicular data recording, the thickness of the layer 2 of a material capable of varying its magnetic characteristics under the effect of irradiation and the size of the holes 4 in the mask 3 or in the stencil 6 are so selected as to provide the ratio between the smaller size values of any one of the magnetic segment 5 being formed and a maximum size thereof as 1:3.5–1:15, respectively.

The thus-prepared specimen is irradiated with a flux of charged particles, e.g., hydrogen ions or helium ions or atoms or some other particles selected from known ones. Type of charged particles, their dose and energy are selected depending on the material of said layer wherein transformation of magnetic properties occurs. The parameters of the fluxes of charged particles may be selected by estimation on the basis of commonly known rules, or experimentally. Under the effect of charged particles there occurs selective transformation of magnetic characteristics of the material of said layer from nonmagnetic to magnetic ones, that is, magnetic segments are formed. Each individual magnetic segment being formed may be of any cross-sectional shape, i.e., round, square, etc. All individual magnetic segments should be single-domain, the fact that is an additional important factor to provide stability of a magnetic recording.

Figure 6:
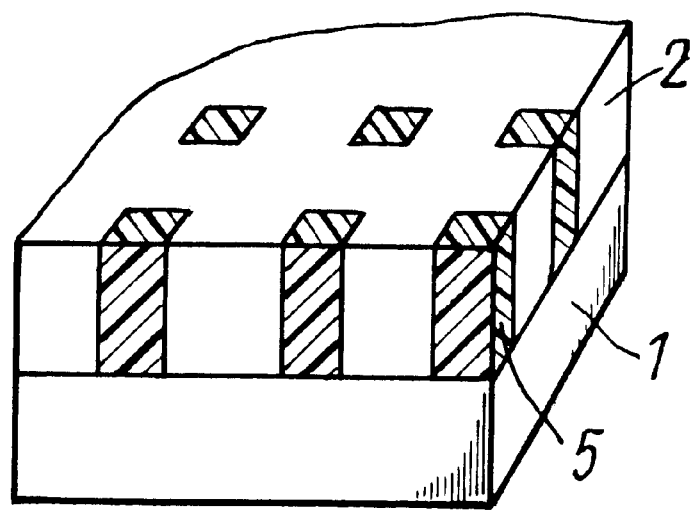
FIG. 6 is a fragmentary view of a magnetic medium for perpendicular data recording, said medium being made according to the method proposed herein.
Figure 7:
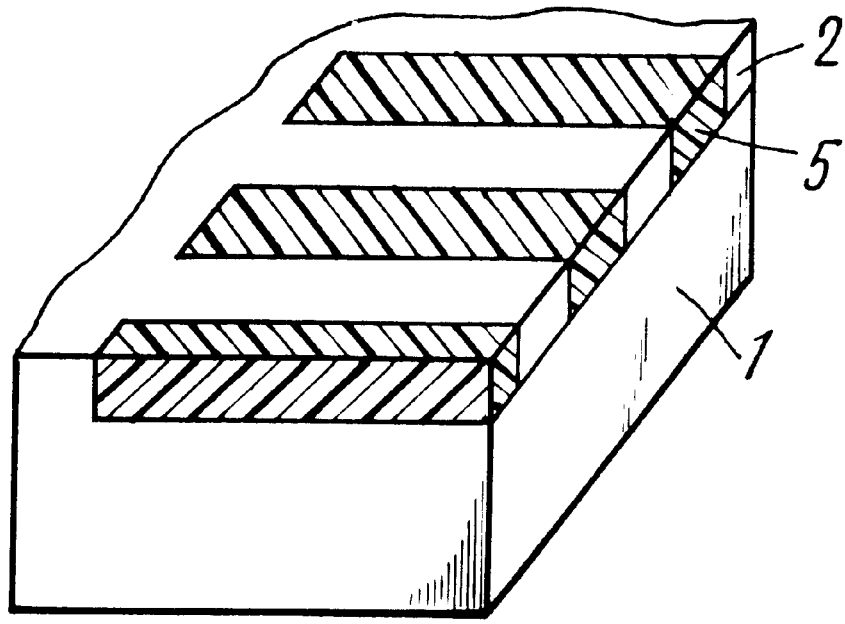
FIG. 7 is a fragmentary view of a magnetic medium for perpendicular data recording, said medium being made according to the method proposed herein.

The size of the magnetic segments may somewhat increase as they move away from the layer surface towards the substrate surface which is due to scattering of the charged particles on the atoms of the layer material. FIGS. 6 and 7 depict ideal shapes of the magnetic segments 5.

Magnetic segments may be arranged differently on the nonmagnetic substrate depending on the type and purpose of a given magnetic medium. For instance, when the magnetic medium for data storage is shaped as a disk, its magnetic segments may be arranged in a radial-circular pattern, and in the case of a film-shaped medium the magnetic segments may be arranged orthogonally.

Irradiation having been completed, the mask is removed by a known technique or is used as a protective layer of the finished magnetic medium for data storage.

The herein-proposed method allows of manufacturing the magnetic medium for data storage having a structure wherein each individual single-domain segment of a magnetic material is separated from another such segment by a segment from a nonmagnetic material, whereby any interference of the magnetic segments with one another is ruled out and high data storage density is ensured, as well as reliable storage of the recorded data. To promote understanding of the present invention, given below are some specific exemplary embodiments thereof appearing in the tabular form.

Industrial Applicability

The herein-proposed invention can find application in preparing storage devices, hybrid microcircuits made use of in, e.g., computers, sound recording apparatus, or video tape recorders.

| Nos. | Substrate material | Material low or zero initial magnetization, deposited on substrate as layer | Layer thickness, nm | Size of individual segment, nm$^2$ | Charged particles | Energy of charged particles | Shape anisotropy factor | Type of magnetic medium for data storage |
|---|---|---|---|---|---|---|---|---|
| 1 | Glass | Fe$_2$O$_3$ | 500 | 100 × 100 | e | 300 KeV | 5 | For perpendicular data recording |
| 2 | Al | CoO | 10 | 100 × 20 | H$^+$ | 600 eV | 4 | For longitudinal data recording |
| 3 | Ceramics | Fe$_2$O$_3$ | 20 | 35 × 100 | H$^+$ | 900 eV | 3.5 | For longitudinal data recording |
| 4 | Ceramics | Fe$_2$O$_3$ | 25 | 25 × 250 | H$^+$ | 600 eV | 10 | For longitudinal data recording |
| 5 | Ceramics | CoO | 10 | 150 × 10 | H$^+$ | 600 eV | 15 | For longitudinal data recording |
| 6 | Ceramics | CoO | 2 | 30 × 15 | H$^+$ | 600 eV | 15 | For longitudinal data recording |
| 7 | Ceramics | CoO | 50 | D = 10 | H$_2$ | 700 eV | 5 | For perpendicular data recording |

What is claimed is:

1. A method of manufacturing a magnetic medium for data storage, comprising the following steps:
   supplying a layer of a material capable of varying its magnetic characteristics under an effect of a plurality of charged particles on a nonmagnetic substrate;
   using a material having a low or zero initial magnetization as said material capable of varying its magnetic characteristics;
   selectively irradiating said layer with a flux of said plurality of charged particles to vary said magnetic characteristics of said material of said layer on a plurality of the irradiated segments thereof, and forming a plurality of nonmagnetic segments, each having a first, second, and third overall dimension;
   forming a plurality of magnetic segments on said layer, each of said segments having a first overall dimension which is a maximum, wherein a ratio between said first dimension and said second or third overall dimension being from (3.5÷15.0):1;
   wherein said layer has a thickness equal to said first, second or third overall dimension of any magnetic segment selected from a plurality of said magnetic segments.

2. The method of claim 1, wherein said step of selective irradiation of said layer is effected through a lithographic mask.

3. The method of claim 1, wherein said step of selective irradiation of said layer is effected through a stencil.

4. The method of claim 1, wherein said step of supplying a material capable of varying its magnetic characteristics includes providing an oxide of a chemical element selected from the group consisting of iron and cobalt is used as said material capable of varying its magnetic characteristics.

5. The method of claim 1, wherein said thickness of said layer of said material capable of varying its magnetic characteristics ranges from about 10 nm to about 500 nm.

6. The method of claim 1, wherein said thickness of said layer of said material capable of varying its magnetic characteristics ranges from about 2 nm to about 50 nm.

7. The method of claim 1, further comprising the step of applying a protective layer from a diamond-like film to said layer having regularly alternating segments compressing said magnetic segments and said nonmagnetic segments.

* * * * *

UNITED STATES PATENT AND TRADEMARK OFFICE
CERTIFICATE OF CORRECTION

PATENT NO. : 6,565,929 B2
DATED : May 20, 2003
INVENTOR(S) : Gurovich et al.

It is certified that error appears in the above-identified patent and that said Letters Patent is hereby corrected as shown below:

<u>Column 7,</u>
Line 41, please change "(3.5÷15.0):1;" to read -- 3.5:1 to 15.0:1; --.

Signed and Sealed this

First Day of June, 2004

JON W. DUDAS
*Acting Director of the United States Patent and Trademark Office*